United States Patent
Kim

(10) Patent No.: US 9,589,387 B2
(45) Date of Patent: *Mar. 7, 2017

(54) IMAGE PROCESSING APPARATUS AND IMAGE PROCESSING METHOD

(71) Applicant: SAMSUNG ELECTRONICS CO., LTD., Suwon-si (KR)

(72) Inventor: Yun Tae Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 61 days.

This patent is subject to a terminal disclaimer.

(21) Appl. No.: 14/550,555

(22) Filed: Nov. 21, 2014

(65) Prior Publication Data

US 2015/0154790 A1 Jun. 4, 2015

(30) Foreign Application Priority Data

Dec. 4, 2013 (KR) ........................ 10-2013-0149880

(51) Int. Cl.
*G06T 15/08* (2011.01)
*G06T 15/50* (2011.01)

(52) U.S. Cl.
CPC ............. *G06T 15/08* (2013.01); *G06T 15/50* (2013.01); *G06T 2207/10004* (2013.01); *G06T 2207/10072* (2013.01)

(58) Field of Classification Search
CPC G06T 15/08; G06T 15/50; G06T 2207/10004
See application file for complete search history.

(56) References Cited

U.S. PATENT DOCUMENTS

| 2009/0306511 A1* | 12/2009 | Yamagata ............ A61B 8/0833 600/447 |
| 2011/0270086 A1 | 11/2011 | Hoctor et al. |
| 2012/0287130 A1* | 11/2012 | Rhee ....................... G06T 15/50 345/426 |
| 2013/0150719 A1 | 6/2013 | Orderud |

FOREIGN PATENT DOCUMENTS

| JP | 2012-5593 A | 1/2012 |
| KR | 2005-278988 A | 10/2005 |
| KR | 10-2012-0116364 A | 10/2012 |

OTHER PUBLICATIONS

Shah et al. "Image-Space Subsurface Scattering for Interactive Rendering of Deformable Translucent Objects",IEEE computer graphics and applications 1 (2009): 66-78.*
Simon Green; "Chapter 16. Real-Time Approximations to Subsurface Scattering"; NVIDIA; GPU Gems; Apr. 1, 2004, 16 pgs.

* cited by examiner

*Primary Examiner* — James A Thompson
*Assistant Examiner* — Tapas Mazumder
(74) *Attorney, Agent, or Firm* — Sughrue Mion, PLLC

(57) ABSTRACT

Disclosed herein are an image processing apparatus and an image processing method for realistically expressing an object. The image processing apparatus includes a volume data generator configured to generate volume data using received signals of an object, and a volume rendering unit configured to perform volume rendering using the volume data to acquire a projection image, and apply a subsurface scattering effect according to virtual lighting information, to the projection image with respect to a user's viewpoint to produce a final image.

15 Claims, 14 Drawing Sheets
(3 of 14 Drawing Sheet(s) Filed in Color)

FIG. 9

| Variance | Weight_Red | Weight_Green | Weight_Blue |
|---|---|---|---|
| 0.0064 | 0.233 | 0.455 | 0.649 |
| 0.484 | 0.100 | 0.336 | 0.344 |
| 0.187 | 0.118 | 0.198 | 0 |
| 0.567 | 0.113 | 0.007 | 0.007 |
| 1.99 | 0.358 | 0.004 | 0 |
| 7.41 | 0.078 | 0 | 0 |

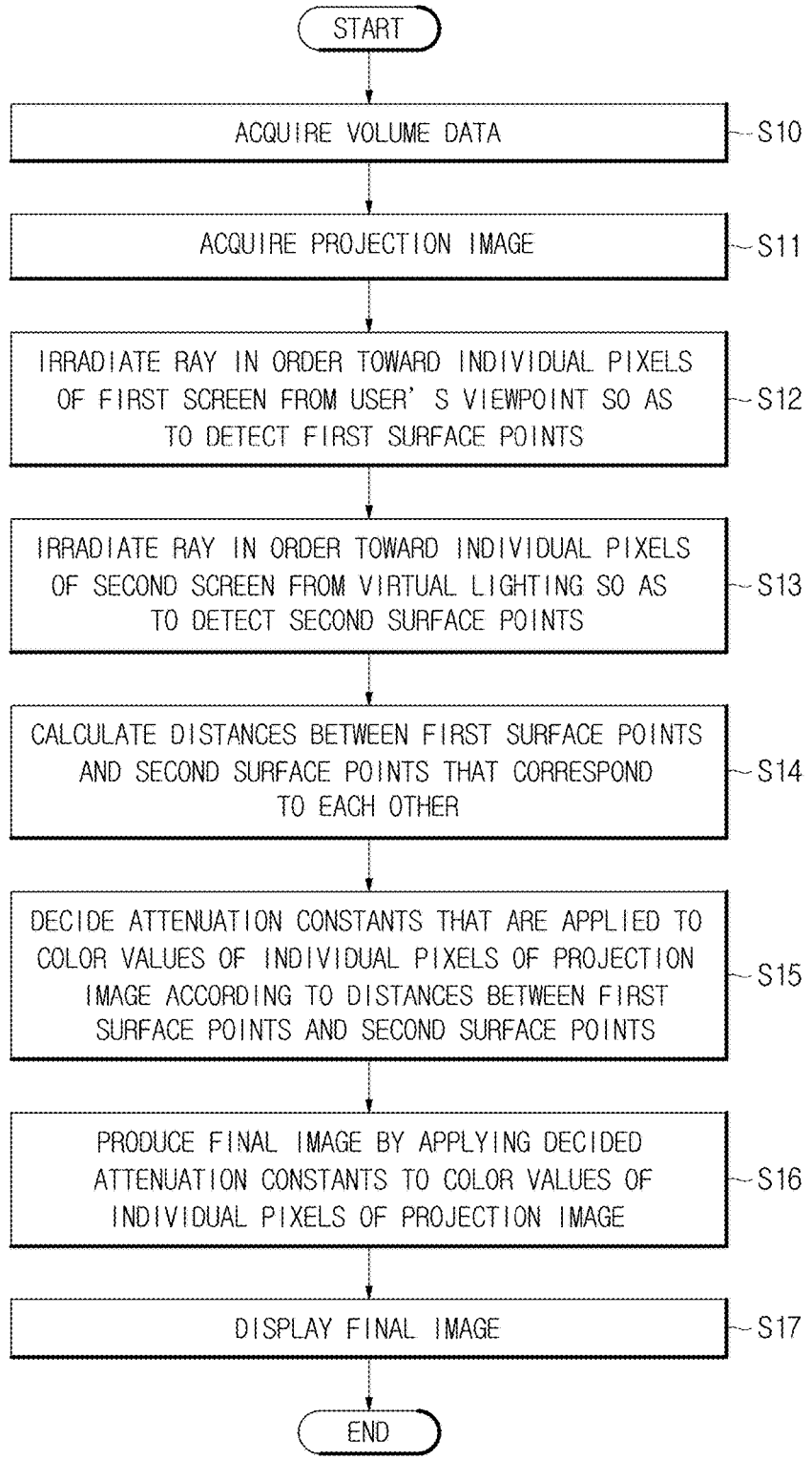

IMAGE PROCESSING APPARATUS AND IMAGE PROCESSING METHOD

CROSS-REFERENCE TO RELATED APPLICATION

This application claims priority from Korean Patent Application No. 10-2013-0149880, filed on Dec. 4, 2013 in the Korean Intellectual Property Office, the disclosure of which is incorporated herein by reference in its entirety.

BACKGROUND

1. Technical Field

Apparatuses and methods consistent with exemplary embodiments relate to an image processing apparatus and an image processing method for realistically expressing an object.

2. Description of the Related Art

Along with an ever growing interest in health, studies about medical imaging apparatuses are actively conducted. Medical imaging apparatuses may include, for example, an X-ray imaging apparatus, a fluoroscopy system, a Computerized Tomography (CT) scanner, a Magnetic Resonance Image (MRI) apparatus, Positron Emission Tomography (PET), and an ultrasonic imaging apparatus.

The medical imaging apparatuses may display a 2-Dimensional (2D) medical image or a 3-Dimensional (3D) medical image of or relating to an object. The 2D medical image may be a section image of the inner tissue of the object. The 3D medical image may be obtained by performing volume rendering of 3D volume data created based on a plurality of section images.

The 2D and 3D medical images may be black-and-white images or color images. Recently, color images are widely used because black-and-white images are considered to have a limitation in replicating a realistic expression of the target object element that is subject to imaging. A color image of the inner tissue of an object can be produced by mapping colors similar to actual colors of the inner tissue to a black-and-white image of the object.

SUMMARY

It is an aspect of the present disclosure to provide an image processing apparatus and an image processing method for realistically expressing an object.

According to an aspect of an exemplary embodiment, there is provided an image processing apparatus including a volume data generator configured to generate volume data using received signals of an object, and a volume rendering unit configured to perform volume rendering using the volume data to acquire a projection image, and apply a subsurface scattering effect according to virtual lighting information, to the projection image with respect to a user's viewpoint to produce a final image.

The virtual lighting information may include an illumination model and a location of a virtual lighting.

The volume rendering unit may include a first surface point detector configured to detect a first surface point that is shown from the user's viewpoint from among points of a surface of the volume data, a second surface point detector configured to detect a second surface point that is shown from the location of the virtual lighting from among the points of the surface of the volume data, and a distance calculator configured to calculate a distance between the first surface point and the second surface point which correspond to each other.

The volume rendering unit may further include a final image producer configured to determine attenuation constants that are applied to color values of each pixel of the projection image according to the distance between the first surface point and the second surface point that correspond to the pixel with reference to attenuation constant graphs acquired from sum-of-Gaussian functions, and apply the attenuation constants to the color values of the pixel of the projection image, thereby producing the final image.

The attenuation constant graphs may include at least one of an attenuation constant graph acquired from a sum-of-Gaussian function for R channel, an attenuation constant graph acquired from a sum-of-Gaussian function for G channel, and an attenuation constant graph acquired from a sum-of-Gaussian function for B channel.

The final image producer may determine attenuation constants that are applied to R, G, and B values of each pixel of the projection image, with reference to the attenuation constant graphs.

Each sum-of-Gaussian function may be acquired by summing weight values of a plurality of Gaussian functions having different variance values.

Different weights according to the R channel, G channel, and B channel may be applied to the plurality of Gaussian functions.

The first surface point detector may be further configured to irradiate a ray from the user's viewpoint toward pixels of a first screen that is perpendicular to the user's viewpoint, and detect the first surface point where the irradiated ray meets the surface of the volume data.

The second surface detector may be further configured to irradiate a ray from the location of the virtual lighting toward pixels of a second screen that is perpendicular to the virtual lighting, and detect the second surface point where the irradiated ray meets the surface of the volume data.

According to an aspect of another exemplary embodiment, there is provided an method of using an image processing apparatus, the method including generating volume data using received signals of an object, performing volume rendering using the volume data to acquire a projection image, and applying a subsurface scattering effect according to virtual lighting information, to the projection image with respect to a user's viewpoint, and producing a final image from the projection image.

The virtual lighting information may include an illumination model and a location of a virtual lighting.

The producing of the final image may include detecting a first surface point that is shown from the user's viewpoint from among points of a surface of the volume data, detecting a second surface point that is shown from the location of the virtual lighting from among the points of the surface of the volume data, and calculating a distance between the first surface point and the second surface point which correspond to each other.

The producing of the final image may further include determining attenuation constants that are applied to color values of each pixel of the projection image according to the distance between the first surface point and the second surface point that correspond to the pixel with reference to attenuation constant graphs acquired from sum-of-Gaussian functions, and applying the attenuation constants to the color values of the pixel of the projection image to produce the final image.

The attenuation constant graphs may include at least one of an attenuation constant graph acquired from a sum-of-Gaussian function for R channel, an attenuation constant graph acquired from a sum-of-Gaussian function for G channel, and an attenuation constant graph acquired from a sum-of-Gaussian function for B channel.

The deciding of the attenuation constant may include determining attenuation constants that are applied to R, G, and B values of each pixel of the projection image, with reference to the attenuation constant graphs.

Each sum-of-Gaussian function may be acquired by summing weight values of a plurality of Gaussian functions having different variance values.

Different weights according to the R channel, G channel, and B channel may be applied to the plurality of Gaussian functions.

BRIEF DESCRIPTION OF THE DRAWINGS

The patent or application file contains at least one drawing executed in color. Copies of this patent or patent application publication with color drawings will be provided by the Office upon request and payment of the necessary fee.

These above and/or other aspects of the disclosure will become apparent and more readily appreciated from the following description of exemplary embodiments, taken in conjunction with the accompanying drawings in which:

FIG. 9 is a table listing variance values and weight values needed to calculate sum-of-gaussian functions for R, G, and B channels according to an exemplary embodiment;

FIG. 12 is a flowchart illustrating an image processing method according to an exemplary embodiment of the present disclosure.

DETAILED DESCRIPTION

Figure 1:
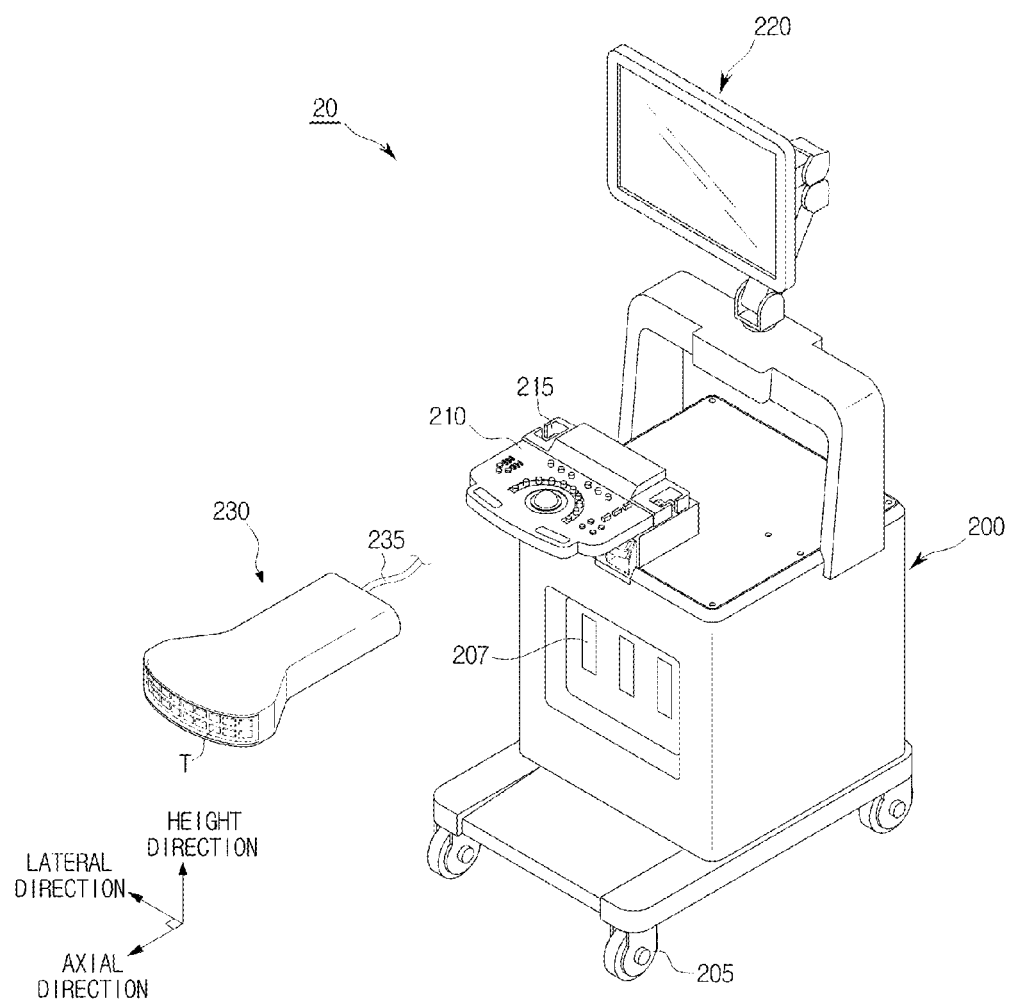
FIG. 1 is a perspective view of an ultrasonic imaging apparatus according to an exemplary embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

Reference will now be made in detail to the exemplary embodiments of the present disclosure, examples of which are illustrated in the accompanying drawings, wherein like reference numerals refer to like elements throughout.

Hereinafter, embodiments of an image processing apparatus and an image processing method will be described with reference to the accompanying drawings.

In the following description, an image processing apparatus may be a medical imaging apparatus. The medical imaging apparatus may be an X-ray imaging apparatus, a fluoroscopy system, a Computerized Tomography (CT) scanner, a Magnetic Resonance Image (MRI) apparatus, Positron Emission Tomography (PET), or an ultrasonic imaging apparatus. However, the medical imaging apparatus is not limited to the above-mentioned apparatuses, and may be any other medical equipment capable of creating 3-Dimensional (3D) volume data from a plurality of section images or a plurality of projection images about the inner tissue of an object. In the following description, for convenience of description, the imaging processing apparatus is assumed to be an ultrasonic imaging apparatus.

The ultrasonic imaging apparatus irradiates ultrasonic waves toward a target inside an object, and receives information in the form of ultrasonic waves (that is, ultrasonic echo) reflected from the target so as to non-invasively acquire section images about soft tissue of the object or images about blood vessels of the object based on the ultrasonic echo.

The ultrasonic imaging apparatus may be a compact, low-priced apparatus compared to other medical imaging apparatuses, such an X-ray imaging apparatus, a CT scanner, a MRI apparatus, and a nuclear medicine diagnosis apparatus, and it can display images in real time. Also, the ultrasonic imaging apparatus provides a high level of safety because there is no risk for patients to be exposed to X-ray radiation. Further, the ultrasonic imaging apparatus is widely used to diagnose the heart, breasts, abdomen, urinary organs, uterus, etc.

FIG. 1 is a perspective view of an ultrasonic imaging apparatus according to an embodiment of the present disclosure. Referring to FIG. 1, an ultrasonic imaging apparatus 20 may include a main body 200, an input unit 210, a display unit 220, and a probe 230.

The main body 200 may accommodate main components of the ultrasonic imaging apparatus 20. For example, referring to FIG. 2, the main body 200 may accommodate a controller 240, a transmit beamformer 250, a receive beamformer 260, an image processor 270, and a storage unit 280.

On one side of the main body 200, one or more female connectors 207 may be provided. A male connector may be physically coupled with one of the female connectors 107. The male connector may be connected to one end of a cable 235, and the other end of the cable 235 may be connected to the probe 230. Alternatively, the probe may communicate with the main body through wireless transmissions and may be battery operated.

In the lower part of the main body 200, a plurality of castors 205 for moving the ultrasonic imaging apparatus 20 may be provided. The castors 205 may fix the ultrasonic imaging apparatus 20 at a specific location, or move the ultrasonic imaging apparatus 20 in a specific direction.

The input unit 210 allows a user to input an instruction or a command for manipulating the ultrasonic imaging apparatus 20. For example, the user may input a diagnosis start command, a command for selecting an area to be diagnosed, a command for selecting a diagnosis type, and a command for selecting a mode for an ultrasonic image to be finally output, through the input unit 210. Modes for ultrasonic images may include, but are not limited to, an Amplitude mode (A-mode), a Brightness mode (B-mode), a Doppler mode (D-mode), an Elastography mode (E-mode), and a motion mode (M-mode). In addition, the user may input information about a user's viewpoint and a location of a virtual lighting through the input unit 210.

The input unit 210 may include at least one of a keyboard, a mouse, a touch screen, a touch pad, a video camera, a microphone, a foot switch, and a foot pedal.

According to an exemplary embodiment, the keyboard may be implemented using software. For example, the keyboard may be implemented as a Graphic User Interface (GUI). A keyboard implemented using software may be displayed through the display unit 220 which may also be a touchscreen.

According to another exemplary embodiment, the keyboard may be implemented using hardware, and mounted on the upper part of the main body 200. The keyboard may include at least one(s) of a switch(s), a key(s), a wheel, a joystick, a trackball, and a knop. The foot switch or the foot pedal may be disposed below the main body 200. The user may control a part of functions of the ultrasonic imaging apparatus 20 using the foot pedal.

On at least one side of the input unit 210, one or more probe holders 215 for holding the probe 230 may be provided. In FIG. 1, a case in which two probe holders 215 having the same size are provided around an edge at two corners of the input unit 210 as shown. However, the probe holders 215 may have different sizes and/or shapes, the number of the probe holders 215 is not limited to two, and the probe holders 215 may be provided at different locations. For example, the probe holders 215 may be provided in one side of the main body 200, and the number of the probe holders 215 may be one or more. When a plurality of probe holders 215 are provided, the probe holders 210 may have different shapes and sizes.

The display unit 220 may display ultrasonic images. Specifically, the display unit 220 may display ultrasonic images corresponding to a mode selected by a user. The display unit 220 may include at least one display.

The at least one display may have only a display function or have both a display function and an input function. If the display is a touch screen, the display may have both a display function and an input function.

The at least one display may be separated from the main body 200. In this case, images produced by the ultrasonic imaging apparatus 20 may be transmitted to the at least one display through wired/wireless communication.

Figure 2:
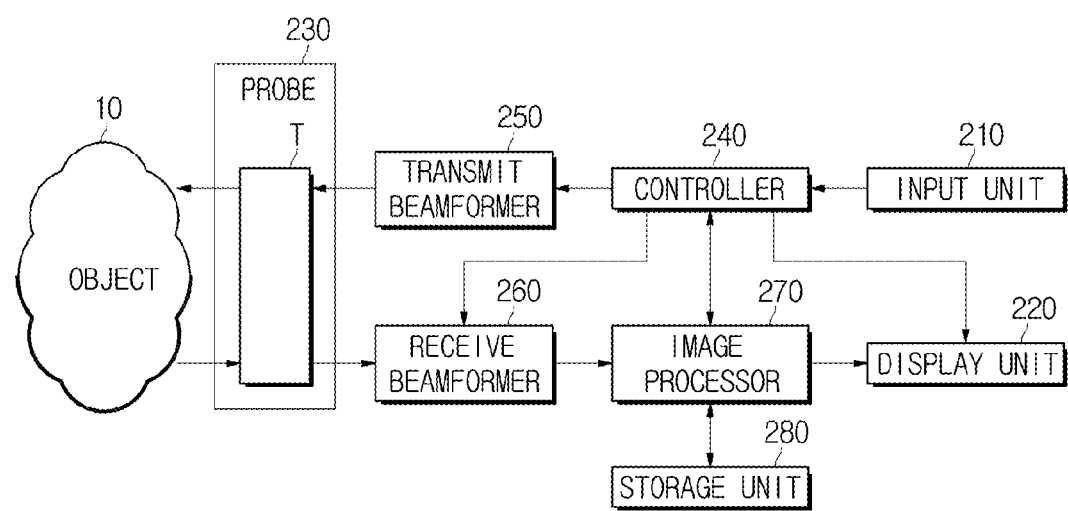
FIG. 2 is a block diagram illustrating a configuration of an ultrasonic imaging apparatus according to an exemplary embodiment of the present disclosure.

The probe 230 contacts the skin surface of an object 10 (see FIG. 2). One or more ultrasonic elements T are installed in one end of the probe 230. The ultrasonic elements T irradiate ultrasonic waves toward a target inside the object 10, receive ultrasonic echo reflected from the target, and convert the ultrasonic echo into an electrical signal. For example, each ultrasonic element T may include an ultrasonic generator to generate ultrasonic waves and an ultrasonic reception device to receive ultrasonic echo and convert the ultrasonic echo into an electrical signal. According to another example, the ultrasonic element T itself may generate ultrasonic waves and receive ultrasonic echo.

The ultrasonic elements T may include ultrasonic transducers. A transducer is a device for converting a specific type of energy into another type of energy. For example, the ultrasonic transducer may convert electric energy into wave energy, or wave energy into electricity energy. In other words, the ultrasonic transducers T may perform all functions of an ultrasonic generator and an ultrasonic receiver.

In more detail, the ultrasonic transducers T may include a piezoelectric material or a piezoelectric thin film. If alternating current power, which may be provided by an external power supply or from an internal power storage unit for example a battery, is applied to the piezoelectric material or the piezoelectric thin film, the piezoelectric material or the piezoelectric thin film vibrates at a specific frequency so that a specific frequency of ultrasonic waves are generated according to the vibration frequency. Meanwhile, if ultrasonic echo having a specific frequency arrives at the piezoelectric material or the piezoelectric thin film, the piezoelectric material or the piezoelectric thin film vibrates according to the frequency of the ultrasonic echo. At this time, the piezoelectric material or the piezoelectric thin film outputs alternating current corresponding to the vibration frequency.

Each ultrasonic transducer T may be a magnetostrictive ultrasonic transducer using the magnetostrictive effect of a magnetic material, a piezoelectric ultrasonic transducer using the piezoelectric effect of a piezoelectric material, or a capacitive micromachined ultrasonic transducer (CMUT) that transmits and receives ultrasonic waves using vibration of several hundreds or thousands of micromachined thin films. However, the ultrasonic transducer T may be any other type ultrasonic transducer capable of generating ultrasonic waves according to electrical signals or generating electrical signals according to ultrasonic waves.

The ultrasonic transducers T may be arranged in a linear array or in a convex array at the end part of the probe 230. In this case, the ultrasonic transducers T may be arranged in a line or in a matrix form. If the ultrasonic transducers T are arranged in a line, by moving the probe 230 in a scan direction, a plurality of ultrasonic images may be acquired. If the ultrasonic transducers are arranged in a matrix form, by transmitting ultrasonic waves at once, a plurality of ultrasonic images may be acquired.

Although not shown in the drawings, a cover for covering the ultrasonic transducers T may be provided.

FIG. 2 is a block diagram of an ultrasonic imaging apparatus according to an embodiment of the present invention. Referring to FIG. 2, an ultrasonic imaging apparatus 20 may include an input unit 210, a display unit 220, a probe 230, a controller 240, a transmit beamformer 250, a receive beamformer 260, an image producer 270, and a storage unit 280.

The controller 240 may control overall operations of the ultrasonic imaging apparatus 20. According to an exemplary embodiment, the controller 240 may generate a control signal for controlling at least one of the transmit beamformer 250, the receive beamformer 260, the image producer 270, and the display unit 220, according to an instruction or command received through the input unit 210. According to another exemplary embodiment, the controller 240 may generate a control signal for controlling at least one of the transmit beamformer 250, the receive beamformer 260, the image producer 270, and the display unit 220, according to an instruction or a command received from an external device through wired/wireless communication. In this case, the ultrasonic imaging apparatus 20 may include a communication unit to receive the instruction or command from the external device.

The transmit beamformer 250 may perform transmit beamforming. The transmit beamforming focuses ultrasonic waves from one or more ultrasonic elements T onto a focal point. That is, the transmit beamforming causes the ultrasonic elements T to generate ultrasonic waves in an appropriate order in order to compensate for time differences with which ultrasonic waves that are generated from the ultrasonic elements T arrive at the focal point.

Figure 3:
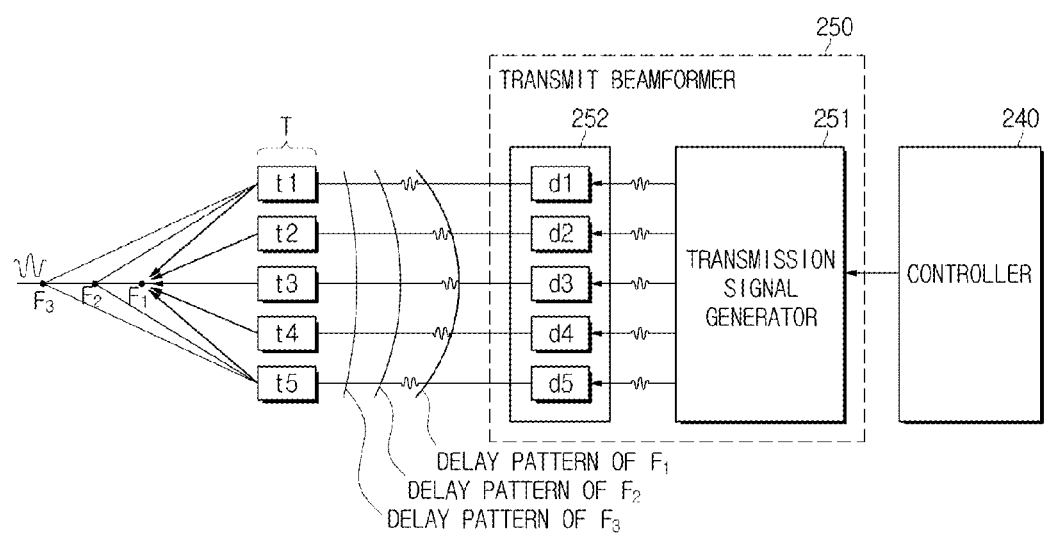
FIG. 3 illustrates a configuration of a transmit beamformer of an ultrasonic imaging apparatus according to an exemplary embodiment.

According to an exemplary embodiment, FIG. 3 illustrates a configuration of the transmit beamformer 250. As illustrated in FIG. 3, the transmit beamformer 250 may include a transmission signal generator 251 and a time delay unit 252.

The transmission signal generator 251 may generate transmission signals (high-frequency alternating current) that are to be applied to the ultrasonic elements T, according to a control signal from the controller 240. The transmission signals generated by the transmission signal generator 251 are provided to the time delay unit 252.

The time delay unit 252 may delay the transmission signals generated by the transmission signal generator 251 to adjust a time at which each transmission signal arrives at the corresponding ultrasonic element T. If the transmission signals delayed by the time delay unit 252 are applied to the ultrasonic elements T, the ultrasonic elements T generate ultrasonic waves corresponding to the frequencies of the transmission signals. The ultrasonic waves generated by the ultrasonic elements T are focused onto a focal point. The location of the focal point onto which the ultrasonic waves generated by the ultrasonic elements T are focused depends on what delay pattern has been applied to the transmission signals.

In more detail, in the embodiment of FIG. 3, five ultrasonic elements t1 to t5 are provided, and three delay patterns that can be applied to transmission signals are represented as thick solid lines, medium solid lines, and thin solid lines, respectively.

When the delay pattern represented by the thick solid lines, or as shown in FIG. 3 as the line furthest right that is labeled as "DELAY PATTERN OF $F_1$," is applied to transmission signals generated by the transmission signal generator 251, ultrasonic waves generated by the ultrasonic elements t1 to t5 are focused onto a first focal point $F_1$.

When the delay pattern represented by the medium solid lines, or as shown in FIG. 3 as the line in the middle that is labeled as "DELAY PATTERN OF $F_2$," is applied to transmission signals generated by the transmission signal generator 251, ultrasonic waves generated by the ultrasonic elements t1 to t5 are focused onto a second focal point $F_2$ which is more distant than the first focal point $F_1$.

When the delay pattern represented as the thin solid lines, or as shown in FIG. 3 as the line furthest left that is labeled as "DELAY PATTERN OF $F_3$," is applied to transmission signals generated by the transmission signal generator 251, ultrasonic waves generated by the ultrasonic elements t1 to t5 are focused onto third focal point $F_3$ which is more distant than the second focal point $F_2$.

As described above, the location of a focal point varies according to what type of delay pattern is applied to transmission signals generated by the transmission signal generator 251. Accordingly, when a delay pattern is applied, ultrasonic waves that are to be applied to an object are focused onto a fixed focal point (fixed-focusing). However, when two or more different delay patterns are applied, ultrasonic waves that are to be applied to an object are focused onto several focal points (multi-focusing).

As such, ultrasonic waves generated by the individual ultrasonic elements T are fixed-focused onto a single focal point, or multi-focused onto several focal points. The focused ultrasonic waves are directed to the inside of an object. The ultrasonic waves directed to the inside of the object are reflected from a target area of the object. Ultrasonic echo reflected from the target area is received by the ultrasonic elements T. Then, the ultrasonic elements T convert the received ultrasonic echo into electrical signals. Hereinafter, the converted electrical signals will be simply referred to as ultrasonic signals. The ultrasonic signals output from the ultrasonic elements T are amplified and filtered, then converted into digital signals, and provided to the receive beamformer 260.

Referring again to FIG. 2, the receive beamformer 260 may perform receive beamforming on the ultrasonic signals converted into the digital signals. The receive beamforming is configured to correct time differences between ultrasonic signals output from individual ultrasonic elements and then focus the corrected signals.

Figure 4:
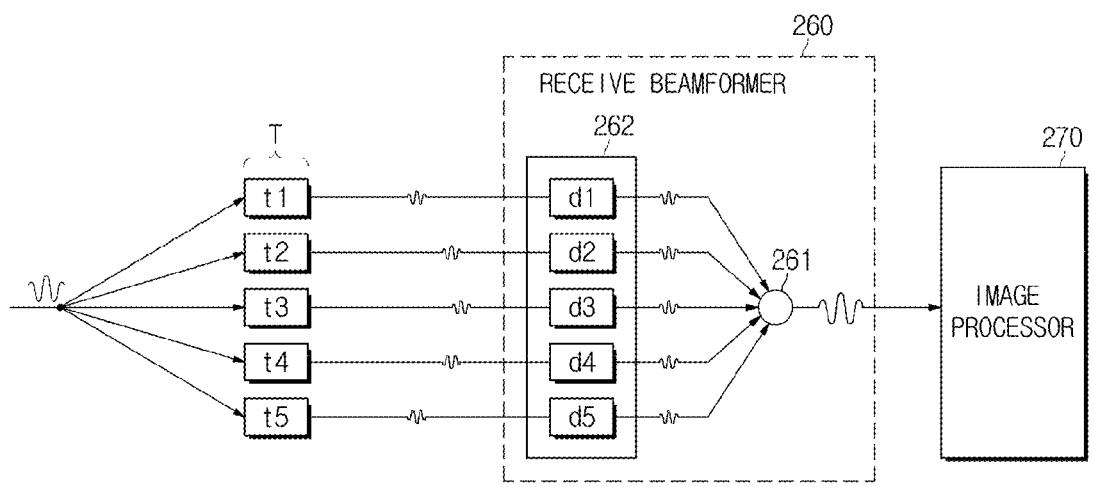
FIG. 4 illustrates a configuration of a receive beamformer of an ultrasonic imaging apparatus according to an exemplary embodiment.

According to an exemplary embodiment, FIG. 4 is a block diagram of the receive beamformer 260. Referring to FIG. 4, the receive beamformer 260 may include a time-difference corrector 262 and a focusing unit 261.

The time-difference corrector 262 delays ultrasonic signals from the individual ultrasonic elements T by predetermined time periods so that the ultrasonic signals can be transferred to the focusing unit 261 at the same time. For example, the time-difference corrector 262 may be a separate component from the time delay unit 252 of the transmit beamformer 250. As another example, the time-difference corrector 262 and the time delay unit 252 may be integrated into one component that performs a time delay function or a time-difference correction function according to a control signal of the controller 240.

The focusing unit 261 may focus the ultrasonic signals subject to time-difference correction by the time-difference corrector 262. At this time, the focusing unit 261 may focus the ultrasonic signals after allocating a predetermined weight (for example, a beamforming coefficient) to each ultrasonic signal to enhance or attenuate the corresponding ultrasonic signal rather than the other ultrasonic signals. The focused ultrasonic signal can be understood as a section image of the object 10. A plurality of section images may be acquired, and the acquired section images may be provided to the image processor 270.

Referring again to FIG. 2, the storage unit 280 may store data and algorithms needed to operate the ultrasonic imaging apparatus 20. For example, the storage unit 280 may store an algorithm needed to create volume data, and an algorithm for volume-rendering the volume data. In addition, the storage unit 280 may store images produced by the image processor 270. The storage unit 280 may be a volatile memory, a non-volatile memory, a hard disk drive, an optical disk drive, or a combination of two or more of the above-mentioned devices.

The image processor 270 may produce an ultrasonic image or volume data based on ultrasonic signals focused by the receive beamformer 260, and may volume-render the volume data. Also, the image processor 270 may reflect subsurface scattering based on virtual lighting information to a projection image acquired from the result of the volume-rendering, thereby producing a final image.

Figure 5:
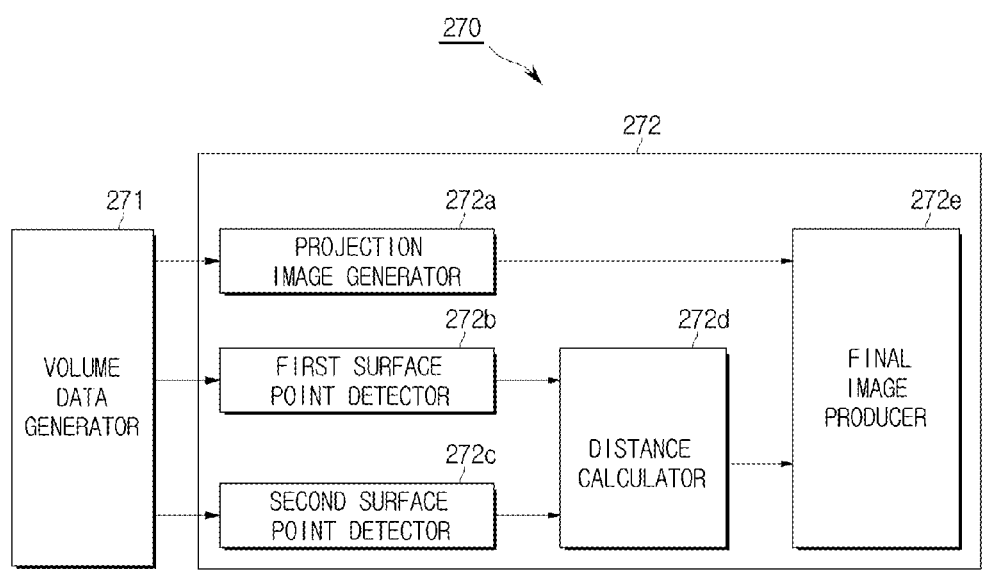
FIG. 5 is a block diagram of an image processor of an ultrasonic imaging apparatus according to an exemplary embodiment.

According to an exemplary embodiment, FIG. 5 is a block diagram of the image processor 270 of the ultrasonic imaging apparatus 20. Referring to FIG. 5, the image processor 270 may include a volume data generator 271 and a volume rendering unit 272.

The volume data generator 271 may generate an ultrasonic image or volume data of an object 10, based on ultrasonic signals focused by the receive beamformer 260. More specifically, if ultrasonic signals for a frame have been focused by the receive beamformer 260, the volume data generator 271 may produce an ultrasonic image, and if ultrasonic signals for a plurality of frames have been focused by the receive beamformer 260, the volume data generator 271 may produce a plurality of ultrasonic images. The plurality of ultrasonic images can be understood to be volume data.

The volume rendering unit 272 may perform volume rendering on volume data using one of well-known volume rendering methods. The volume rendering may be classified into surface rendering and direct volume rendering.

The surface rendering is to extract surface information from volume data based on predetermined scalar values and amounts of spatial changes, to convert the surface information into a geometric factor, such as a polygon or a curved patch, and then to apply a conventional rendering technique to the geometric factor. Examples of the surface rendering are a marching cubes algorithm and a dividing cubes algorithm.

The direct volume rendering is configured to directly render volume data without converting volume data into a geometric factor. The direct volume rendering is useful for representing a translucent structure because it can visualize the inside of an object. The direct volume rendering may be classified into an object-order method and an image-order method according to a way of approaching volume data.

The object-order method is configured to search for 2D slices (that is, objects) in order under an assumption that volume data is composed of a stack of 2D slices, thereby deciding pixel values.

The image-order method is to sequentially decide pixel values in the order of scan lines of an image. An example of the image-order method is Ray-Casting.

Figure 6:
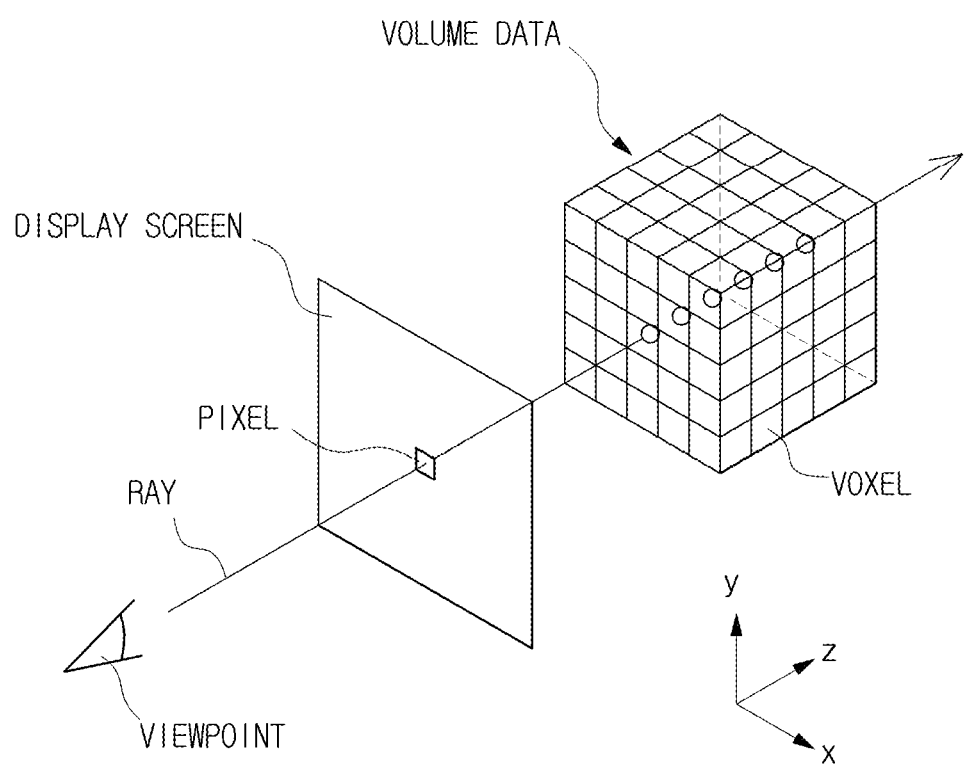
FIG. 6 is a view for describing a concept of volume rendering according to an exemplary embodiment.

Particularly, Ray-Casting is, as illustrated in FIG. 6, irradiating a virtual ray from a user's viewpoint toward a predetermined pixel of a first screen, wherein the first screen may be perpendicular to the user's viewpoint, and to detect voxels through which the virtual ray has been transmitted from among voxels of volume data. Then, color values of the detected voxels are accumulated to decide a color value of the corresponding pixel of the first screen, and opacity values of the detected voxels are accumulated to decide an opacity value of the corresponding pixel. The operation is performed on all pixels of the first screen, thereby obtaining a projection image resulting from projecting the volume data onto the first screen with respect to the user's viewpoint.

According to an exemplary embodiment, the detecting of voxels through which the virtual ray has been transmitted may consist of some specific operations. Particularly, the detecting may include sampling being performed at regular distances along the virtual ray to acquire a color value and an opacity value at each sampling point. Then, color values acquired at the individual sampling points are accumulated to decide a color value of the corresponding pixel of a projection image, and opacity values acquired at the individual sampling points are accumulated to decide an opacity value of the corresponding pixel of the projection image.

Referring again to FIG. 5, the volume rendering unit 272 may perform volume rendering using one of the above-described volume rendering methods. In the following description, for convenience of description, a case in which volume rendering is performed according to the Ray-Casting will be described as an example.

According to an exemplary embodiment, the volume rendering unit 272 may reflect a subsurface scattering effect based on virtual lighting information to the projection image acquired as the result of the volume rendering, thereby producing a final image. Before the volume rendering unit 272 is described in detail, subsurface scattering will be briefly described below.

A human's skin has translucency of low transparency. Accordingly, when light is irradiated onto a human's skin, a part of the irradiated light is reflected from the skin, the other part of the irradiated light is transmitted, and a part of the transmitted light is reflected from or absorbed in inner tissue under the skin. As a result, the structure or color of the inner tissue is shown through the skin, and this phenomenon is called subsurface scattering. The subsurface scattering is more significant when a human (specifically, a human's skin) has light at his/her back. If a viewpoint faces a light source and a human is located between the viewpoint and the light source, a body part having a thin thickness, such as ears, makes light irradiated from the light source pass toward the viewpoint.

Because peoples are familiar with human skin images, they may feel a sense of distance from a projection image no subsurface scattering effect having been reflected because the projection image is different from a general skin image. Accordingly, by reflecting a subsurface scattering effect to a projection image acquired as the result of volume rendering to produce a final image, and displaying the final image, an object can be represented more realistically than when no subsurface scattering effect has been reflected to the projection image, which may give psychological satisfaction to users.

As described above, the volume rendering unit 272 of the image processor 270 may reflect a subsurface scattering effect based on virtual lighting information to a projection image obtained by performing volume rendering on volume data with respect to a user's viewpoint, thereby producing a final image. Hereinafter, a configuration of the volume rendering unit 272, and a method of producing a final image in the volume rendering unit 272 will be described in detail.

Referring to FIG. 5, the volume rendering unit 272 may include a projection image producer 272a, a first surface point detector 272b, a second surface point detector 272c, a distance calculator 272d, and a final image producer 272e.

The projection image producer 272a may perform volume rendering based on information about a user's viewpoint and virtual lighting information so as to produce a projection image with respect to the user's viewpoint. As described above with reference to FIG. 6, a virtual ray is irradiated toward a predetermined pixel of a first screen from a user's viewpoint, and sampling is performed at regular distances along the virtual ray to acquire a color value and an opacity value at each sampling point.

A color value corresponding to a sampling point may be calculated based on the virtual lighting information. More specifically, the virtual lighting information may include a location of a virtual lighting. The projection image producer 272a may increase a color intensity of a sampling point located close to the virtual lighting, and increase a color intensity of a sampling point located distant from the virtual lighting less than that of the sampling point located close to the virtual lighting or maintain the color intensity of the sampling point located distant from the virtual lighting.

The virtual lighting information may include an illumination model, and an increase amount in color intensity of a sampling point may be decided depending on the illumination model. Specifically, an illumination model may include a local illumination model and a global illumination model. The local illumination model is an illumination model considering only light that is incident directly from a light source to the surface of an object, and the global illumination model is an illumination model considering both light that is incident directly from a light source to the surface of an object and light that is reflected from the surface of another object and then incident to the surface of the object.

If a color value and an opacity value are acquired at each sampling point based on the virtual lighting information as described above, the projection information producer 272a may accumulate color values acquired for the individual sampling points, and determine the resultant color value as a color value of the corresponding pixel through which a virtual ray has been transmitted. Then, the projection image producer 272a may accumulate opacity values acquired for the individual sampling points, and determine the resultant opacity value as an opacity color value of the corresponding pixel through which a virtual ray has been transmitted.

The projection image producer 272a may perform operations, such as irradiating a virtual ray, sampling, accumulation of color values, and accumulation of opacity values, on all pixels of the first screen, sequentially. As a result, a projection image to which volume data has been projected on the first screen with respect to a user's viewpoint can be acquired. The acquired projection image may be provided to the final image producer 272e which will be described later.

The first surface point detector 272b may detect first surface points. The first surface points may be points that are shown from a user's viewpoint among points constructing a surface of volume data. The first surface point detector 272b may irradiate rays from a user's viewpoint toward pixels of the first screen perpendicular to the user's viewpoint, sequentially, and detect points at which the irradiated rays meet the surface of the volume data, as first surface points. Information about the detected first surface points, for example, coordinates of the first surface points may be provided to the distance calculator 272d which will be described later.

The second surface point detector 272c may detect second surface points. The second surface points may be surface points that are shown from the location of the virtual lighting among the points construction the surface of the volume data. The second surface point detector 272c may irradiate rays from the virtual lighting toward pixels of a second screen perpendicular to the virtual lighting, sequentially, and detect points at which the irradiated rays meet the surface of the volume data, as second surface points. Information about the detected second surface points, for example, coordinates of the second surface points may be provided to the distance calculator 272d which will be described later.

The distance calculator 272d may calculate distances between first surface points and second surface points that correspond to each other, among the first surface points detected by the first surface point detector 272b and the second surface points detected by the second surface point detector 272c.

Figure 7:
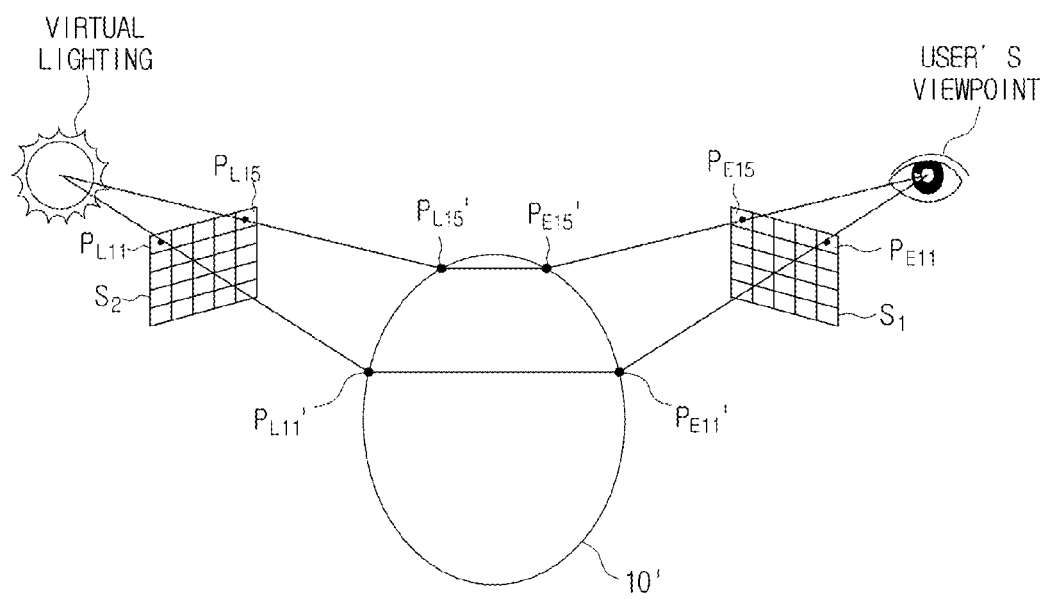
FIG. 7 is a view for describing a correlation between first surface points and second surface points according to an exemplary embodiment.

FIG. 7 is a view for describing a correlation between first surface points and second surface points. In FIG. 7, a user's viewpoint, a first screen $S_1$ perpendicular to the user's viewpoint, pixels $P_{E11}$ and $P_{E15}$ of the first screen $S_1$, first surface points $P_{E11'}$ and $P_{E15'}$, a virtual lighting, a second screen $S_2$ perpendicular to the virtual lighting, pixels $P_{L11}$ and $P_{L15}$ of the second screen $S_2$, and second surface points $P_{L11'}$ and $P_{L15'}$ are shown.

As shown in FIG. 7, the pixel $P_{E11}$ corresponding to the first row and column of the first screen $S_1$ is defined as a pixel located to the upper and left of the first screen $S_1$ when the first screen $S_1$ is shown from the user's viewpoint. The pixel $P_{L11}$ corresponding to the first row and column of the second screen $S_2$ is defined as a pixel located to the upper and right of the second screen $S_2$ when the second screen $S_2$ is shown from the location of the virtual lighting. In this case, the pixel $P_{E11}$ located at the first row and column of the first screen $S_1$ corresponds to the pixel $P_{L11}$ located at the first row and column of the second screen $S_2$. That is, corresponding pixels between the first screen $S_1$ and the second screen $S_2$ are pixels at the same locations on the first screen $S_1$ and the second screen $S_2$.

Likewise, first surface points and second surface points that correspond to each other are first surface points and second surface points detected by rays emitted from pixels at the same locations on the first screen $S_1$ and the second screen $S_2$. Referring to FIG. 7, a point $P_{E11'}$ at which a ray emitted from the pixel $P_{E11}$ located at the first row and column of the first screen $S_1$ meets the surface of volume data 10' corresponds to a point $P_{L11'}$ at which a ray emitted from the pixel $P_{L11}$ located at the first row and column of the second screen $S_2$ meets the surface of the volume data 10'. Likewise, a point $P_{E15'}$ at which a ray emitted from the pixel $P_{E15}$ located at the first row and the fifth column of the first screen $S_1$ meets the surface of the volume data 10' corresponds to a point $P_{L15'}$ at which a ray emitted from the pixel $P_{L15}$ located at the first row and the fifth column of the second screen $S_2$ meets the surface of the volume data 10'.

Referring again to FIG. 5, the distance calculator 272d may calculate distances between the first surface points and the second surface points that correspond to each other, as described above with reference to FIG. 7. The distances between the first surface points and the second surface points that correspond to each other may be calculated by Equation (1), below.

$$r=|P_L(x,y,z)-P_E(x,y,z)| \quad (1)$$

In Equation (1), $P_E(x, y, z)$ represents coordinates of a first surface point, and $P_L(x, y, z)$ represents coordinates of a second surface point. r represents a distance between the first surface point and the second surface point. A distance value calculated by Equation (1) may be provided to the final image producer 272f which will be described later.

The final image producer 272f may decide attenuation constants that are applied to color values of each pixel of the projection image, according to a distance between a first surface point and a second surface point corresponding to the pixel of the projection image, and applies the attenuation constants to the color values of the pixel of the projection image, thereby producing a final image. Applying attenuation constants to color values of each pixel of a projection image means multiplying the color values of the pixel of the projection image by the attenuation constants.

Meanwhile, each pixel of the projection image may include R, G, and B values as color values, and the attenuation constants may be applied to the R, G, and B values, respectively. The attenuation constants that are applied to the R, G, and B values of each pixel may be decided based on attenuation constant graphs for R, G, and B channels.

Figure 8:
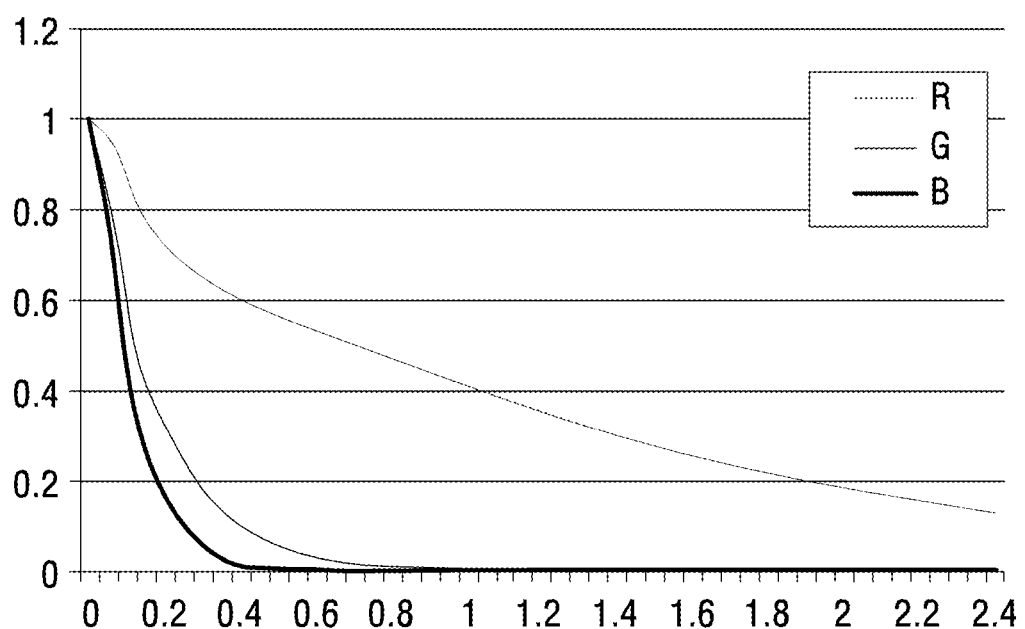
FIG. 8 is graphs showing sum-of-gaussian functions for R, G, and B channels according to an exemplary embodiment.

FIG. 8 shows attenuation constant graphs for R, G, and B channels. In the graphs shown in FIG. 8, the horizontal axis represents a distance between a first surface point and a second surface point, and the vertical axis represents attenuation constants. As shown in FIG. 8, the B channel shows a greatest degree of attenuation with respect to the distance between the first surface point and the second surface point, the R channel shows a smallest degree of attenuation with respect to the distance between the first surface point and the second surface point, and the G channel shows an intermediate degree of attenuation with respect to the distance between the first surface point and the second surface point.

The attenuation constant graphs shown in FIG. 8 are graphs of sum-of-Gaussian functions for R, G, and B channels. Each sum-of-Gaussian function may be acquired by summing weights of a plurality of Gaussian functions. The sum-of-Gaussian function can be expressed as Equation (2), below.

$$A(r)=\Sigma_{i=1}^{k} w_i G(v_i, r) \quad (2)$$

In Equation (2), A(r) represents a sum-of-Gaussian function. That is, A(r) represents an attenuation constant according to a distance r between a first surface point and a second surface point that correspond to each other. $G(v_i, r)$ represents a Gaussian function. $w_i$ represents a weight that is multiplied by the Gaussian function. i represents an integer ranging from 1 to k, and k is the number of Gaussian functions needed to calculate a sum-of-Gaussian function. For example, if k is 6, a sum-of-Gaussian function A(r) is obtained by summing weights of 6 Gaussian functions. However, the number of Gaussian functions needed to calculate a sum-of-Gaussian function is not limited to 6, and Gaussian functions more or less than 6 Gaussian functions may be used to calculate a sum-of-Gaussian function. Hereinafter, for convenience of description, an embodiment of calculating sum-of-Gaussian functions for individual R, G, and B values using 6 Gaussian functions will be described.

Meanwhile, a Gaussian function can be expressed as Equation (3), below.

$$G(v,r)=e^{-r^2/2v} \quad (3)$$

In Equation (3), v represents a variance value of the Gaussian function, and r represents a distance value between a first surface point and a second surface point that correspond to each other.

As described above, sum-of-Gaussian functions for R, G, and B channels can be respectively calculated. At this time, the same kind of Gaussian functions may be applied to the R, G, and B channels, while different weights may be applied to the respective Gaussian functions for R, G, and B channels. For example, when 6 Gaussian functions are used to calculate a sum-of-Gaussian function for each of R, G, and B channels, variation values and weight values needed to calculate Gaussian functions for each of R, G, and B channels are shown in FIG. 9.

Referring to FIG. 9, in order to calculate a sum-of-Gaussian function for each of R, G, and B channels, 6 Gaussian functions respectively having variance values of 0.0064, 0.0484, 0.187, 0.567, 1.99, and 7.41 may be used. Also, weight values that are applied to the respective Gaussian functions may vary depending on R, G, and B channels.

Figure 10:
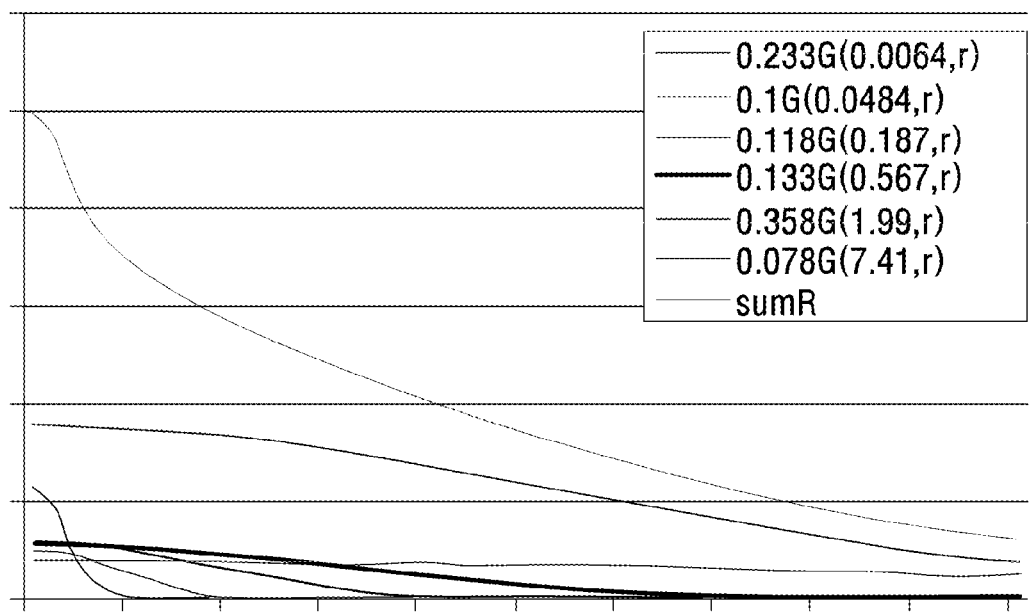
FIG. 10 shows graphs of 6 gaussian functions to which weights for R channel have been applied, and a graph of a sum-of-gaussian function obtained by summing the 6 gaussian functions according to an exemplary embodiment.

Graphs of 6 Gaussian functions to which weight values for the R channel among values shown in FIG. 9 have been applied, and a graph of a sum-of-Gaussian function obtained by summing the 6 Gaussian functions to which the weight values have been applied are shown in FIG. 10.

In FIG. 10, "sumR" represents a sum-of-Gaussian function for R channel. The sum-of-Gaussian function sumR may be obtained by summing 6 Gaussian functions (that is, 0.233G (0.0064, r), 0.1G (0.0484, r), 0.118G (0.187, r), 0.113G (0.567, r), 0.358G (1.99, r), and 0.078 (7.41, r)) to which weight values for R channel have been applied. A graph of the sum-of-Gaussian function sumR is identical to the attenuation constant graph for R channel among the attenuation constant graphs shown in FIG. 8.

Although not shown in FIG. 10, a sum-of-Gaussian function for G channel can be also obtained using the same method as described above. More specifically, a sum-of-Gaussian function for G channel may be obtained by summing 5 Gaussian functions (that is, 0.455G (0.0064, r), 0.336G (0.0484, r), 0.198G (0.187, r), 0.007G (0.567, r), and 0.004G (1.99, r)) to which weight values for G channel have been applied. The reason why 5 Gaussian functions are used is because a weight value that is applied to a Gaussian function having a variance value of 7.41 is 0, as shown in FIG. 9.

A sum-of-Gaussian function for B channel can be also obtained using the same method. More specifically, a sum-of-Gaussian function for B channel may be obtained by summing 3 Gaussian functions (that is, 0.649G (0.0064, r), 0.344G (0.0484, r), and 0.007G (0.567, r)) to which weight values for B channel have been applied. The reason why 3 Gaussian functions are used is because weight values that are applied to Gaussian functions having variance values of 0.187, 0.199, and 7.41 are 0, as shown in FIG. 9.

Meanwhile, the variance values and the weight values as shown in FIG. 9 may be experimentally decided. That is, a variance value and a weight value of a Gaussian function are decided such that a skin color of an object in a projection image is represented similar to a skin color according to subskin scattering when light has been actually irradiated onto a human's skin. The experimentally decided variance values and weight values may be stored in the storage unit 280. Also, sum-of-Gaussian functions (that is, attenuation constant graphs for R, G, and B channels) calculated for R, G, and B channels based on the experimentally decided variance values and weight values may be stored in the storage unit 280.

By deciding attenuation constants that are respectively applied to R, G, and B values of each pixel of the projection image based on attenuation constant graphs for R, G, and B channels acquired using the method described above, and applying the decided attenuation constants to the R, G, and B values of the pixel, an image to which a subsurface scattering effect based on virtual lighting information has been reflected can be produced.

Figure 11A:
FIG. 11A shows an example of an image to which a subskin scattering effect based on virtual lighting information has been reflected, the image acquired when a virtual lighting is positioned to the right of a user's viewpoint and lower than the user's viewpoint according to an exemplary embodiment.
Figure 11B:
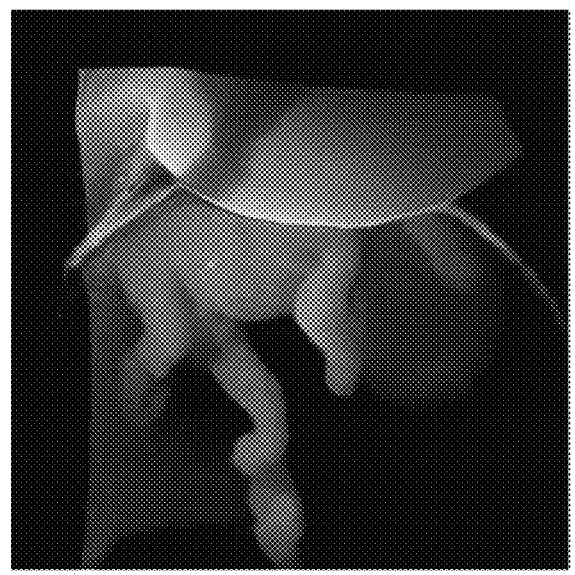
FIG. 11B shows an example of an image to which a subskin scattering effect based on virtual lighting information has been reflected, the image acquired when a virtual lighting is positioned to the left of a user's viewpoint and lower than the user's viewpoint according to an exemplary embodiment.
Figure 11C:
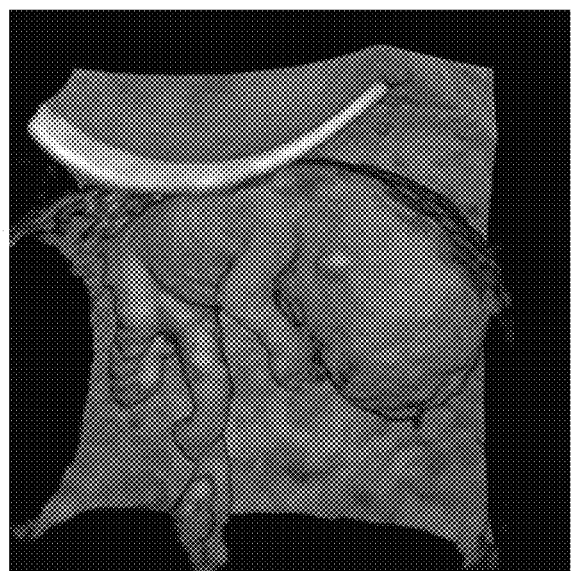
FIG. 11C shows an example of a projection image to which no subskin scattering effect based on virtual lighting information has been reflected according to an exemplary embodiment.

FIG. 11A shows an example of an image to which a subskin scattering effect based on virtual lighting information has been reflected, the image acquired when a virtual lighting is positioned to the right of a user's viewpoint and lower than the user's viewpoint. FIG. 11B shows an example of an image to which a subskin scattering effect based on virtual lighting information has been reflected, the image acquired when a virtual lighting is positioned to the left of a user's viewpoint and lower than the user's viewpoint. FIG. 11C shows an example of a projection image to which no subskin scattering effect based on virtual lighting information has been reflected. The skin color of the fetus in the images shown in FIGS. 11A and 11B is more natural than the skin color of the fetus in the image shown in FIG. 11C.

FIG. 12 is a flowchart illustrating an image processing method according to an embodiment of the present disclosure.

Referring to FIGS. 2 and 12, volume data of the object 10 may be acquired through the probe 230 (operation S10). Then, information about a user's viewpoint and virtual lighting information may be set through the input unit 210.

For example, a user may input a figure corresponding to a user's viewpoint or a location of a virtual lighting using a keyboard mounted on the input unit 210 to set the user's viewpoint or the location of the virtual lighting. As another example, a user may locate a pointer at a predetermined location on a display screen of the display unit 220 using a keyboard or a mouse mounted on the input unit 210, and then selects the pointer to set the user's viewpoint or the location of the virtual lighting. As still another example, a user may select a predetermined location on a display screen of the display unit 220 using his/her finger or a stylus pen to set the user's viewpoint or the location of the virtual lighting.

Thereafter, volume rendering may be performed based on the information about the user's viewpoint and the virtual lighting information, so that a projection image may be acquired with respect to the user's viewpoint (operation S11). Operation S11 of acquiring the projection image may include: irradiating a virtual ray toward a predetermined pixel of a first screen perpendicular to the user's viewpoint from the user's viewpoint; performing sampling at regular distances along the virtual ray; acquiring a color value and an opacity value at each sampling point based on the virtual lighting information; accumulating acquired color values to decide a color value of the pixel to which the virtual ray has been irradiated; accumulating acquired opacity values to decide an opacity value of the pixel to which the virtual ray has been irradiated; and performing irradiation of a virtual ray, sampling, accumulation of color values, and accumulation of opacity values on the remaining pixels of the first screen.

Thereafter, a virtual ray may be irradiated in order toward the individual pixels of the first screen from the user's viewpoint so as to detect first surface points at which the irradiated virtual ray meets the surface of volume data (10' of FIG. 7) (operation S12).

Then, a virtual ray may be irradiated in order toward the individual pixels of a second screen perpendicular to the virtual lighting from the location of the virtual lighting so as to detect second surface points at which the irradiated virtual ray meets the surface of the volume data (10' of FIG. 7) (operation S13).

If the first surface points that are shown from the user's viewpoint and the second surface points that are shown from the location of the virtual lighting are detected, distances between the first surface points and the second surface points that correspond to each other may be respectively calculated (operation S14).

Thereafter, attenuation constants that are applied to the color values of the individual pixels of the projection image may be decided according to the distances between the first surface points and the second surface points, with reference to attenuation constant graphs acquired from sum-of-Gaussian functions (operation S15). Operation S15 of deciding the attenuation constants may include: calculating sum-of-Gaussian functions for R, G, and B channels; and deciding attenuation constants that are respectively applied to R, G, and B values among color values of each pixel of the projection image with reference to the sum-of-Gaussian functions calculated for the R, G, and B channels. Each sum-of-Gaussian function may be calculated by summing a plurality of Gaussian functions. According to an embodiment, as shown in FIG. 9, the sum-of-Gaussian functions may be calculated by applying different weights to the R, G, and B channels, respectively.

Then, a final image may be produced by applying the decided attenuation constants to the color values of the individual pixels of the projection image (operation S16). That is, a final image may be produced by multiplying the color values of the individual pixels of the projection image by the decided attenuation constants.

The final image may be displayed through the display unit 220 (operation S17).

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An image processing apparatus comprising:
a volume data generator configured to generate volume data using received signals of an object; and
a volume rendering unit configured to perform volume rendering using the volume data to acquire a projection image, and apply a subsurface scattering effect according to virtual lighting information, to the projection image with respect to a user's viewpoint to produce a final image,
wherein the virtual lighting information comprises a location of a virtual lighting, and
wherein the volume rendering unit comprises:
a final image producer configured to determine attenuation constants that are applied to color values of each pixel of the projection image according to a distance between a first surface point and a second surface point that correspond to the pixel with reference to attenuation constant graphs acquired from sum-of-Gaussian functions, and apply the attenuation constants to the color values of the pixel of the projection image, thereby producing the final image,
wherein the first surface point is configured to be shown from the user's viewpoint from among points of a surface of the volume data and the second surface point is configured to be shown from the location of the virtual lighting from among the points of the surface of the volume data, and
wherein the attenuation constant graphs include at least one of an attenuation constant graph acquired from a sum-of-Gaussian function for R channel, an attenuation constant graph acquired from a sum-of-Gaussian function for G channel, and an attenuation constant graph acquired from a sum-of-Gaussian function for B channel.

2. The image processing apparatus of claim 1, wherein the virtual lighting information further comprises an illumination model.

3. The image processing apparatus of claim 2, wherein the volume rendering unit further comprises:
a first surface point detector configured to detect the first surface point; and
a distance calculator configured to calculate the distance between the first surface point and the second surface point which correspond to each other.

4. The image processing apparatus according to claim 3, wherein the first surface point detector is further configured to irradiate a ray from the user's viewpoint toward pixels of a first screen that is perpendicular to the user's viewpoint, and detect the first surface point where the irradiated ray meets the surface of the volume data.

5. The image processing apparatus according to claim 3, wherein the second surface point detector is further configured to irradiate a ray from the location of the virtual lighting toward pixels of a second screen that is perpendicular to the virtual lighting, and detect the second surface point where the irradiated ray meets the surface of the volume data.

6. The image processing apparatus of claim 1, wherein the final image producer determines attenuation constants that are applied to R, G, and B values of each pixel of the projection image, with reference to the attenuation constant graphs.

7. The image processing apparatus of claim 1, wherein each sum-of-Gaussian function is acquired by summing weight values of a plurality of Gaussian functions having different variance values.

8. The image processing apparatus according to claim 7, wherein different weights according to the R channel, G channel, and B channel are applied to the plurality of Gaussian functions.

9. An method of using an image processing apparatus, the method comprising:
generating volume data using received signals of an object;
performing volume rendering using the volume data to acquire a projection image; and
applying a subsurface scattering effect according to virtual lighting information, to the projection image with respect to a user's viewpoint; and
producing a final image from the projection image,
wherein the virtual lighting information comprises a location of a virtual lighting, and
wherein the producing of the final image further comprises:
determining attenuation constants that are applied to color values of each pixel of the projection image according to a distance between a first surface point and a second surface point that correspond to the pixel with reference to attenuation constant graphs acquired from sum-of-Gaussian functions; and
applying the attenuation constants to the color values of the pixel of the projection image to produce the final image,
wherein the first surface point is configured to be shown from the user's viewpoint from among points of a surface of the volume data and a second surface point is configured to be shown from the location of the virtual lighting from among the points of the surface of the volume data, and
wherein the attenuation constant graphs include at least one of an attenuation constant graph acquired from a sum-of-Gaussian function for R channel, an attenuation constant graph acquired from a sum-of-Gaussian function for G channel, and an attenuation constant graph acquired from a sum-of-Gaussian function for B channel.

10. The method of claim 9, wherein the virtual lighting information further comprises an illumination model.

11. The method of claim 10, wherein the producing of the final image comprises:
detecting the first surface point;
detecting the second surface point; and
calculating the distance between the first surface point and the second surface point which correspond to each other.

12. The method of claim 9, wherein the deciding of the attenuation constant comprises:

determining attenuation constants that are applied to R, G, and B values of each pixel of the projection image, with reference to the attenuation constant graphs.

13. The method of claim 9, wherein each sum-of-Gaussian function is acquired by summing weight values of a plurality of Gaussian functions having different variance values.

14. The method of claim 13, wherein different weights according to the R channel, G channel, and B channel are applied to the plurality of Gaussian functions.

15. An image processing apparatus comprising:

a probe configured to receive signals from an object;

an image processor configured to generate volume data using the received signals; perform volume rendering using the volume data to acquire a projection image, apply a subsurface scattering effect according to virtual lighting information to the projection image with respect to a user's viewpoint to produce a final image; and a display configured to display the final image, wherein the image processor is further configured to detect, on a surface of the volume data, a first surface point as seen from a user's viewpoint and a second surface point as seen from a location of virtual lighting which corresponds to the first surface point, determine a distance between the first surface point and the second surface point, determine attenuation constants that are applied to color values of each pixel of the projection image according to a distance between the first surface point and the second surface point that correspond to the pixel with reference to attenuation constant graphs acquired from sum-of-Gaussian functions, and apply the attenuation constants to the color values of the pixel of the projection image, thereby producing the final image, and wherein the attenuation constant graphs include at least one of an attenuation constant graph acquired from a sum-of-Gaussian function for R channel, an attenuation constant graph acquired from a sum-of-Gaussian function for G channel, and an attenuation constant graph acquired from a sum-of-Gaussian function for B channel.

* * * * *